US009781731B2

(12) United States Patent
Chen et al.

(10) Patent No.: US 9,781,731 B2
(45) Date of Patent: Oct. 3, 2017

(54) WIRELESS COMMUNICATION SYSTEM, BASE STATION AND WIRELESS TERMINAL FOR PERFORMING A COORDINATED UPLINK TRANSMISSION

(71) Applicant: FUJITSU LIMITED, Kawasaki-shi, Kanagawa (JP)

(72) Inventors: Hongyang Chen, Kawasaki (JP); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 384 days.

(21) Appl. No.: 14/674,530

(22) Filed: Mar. 31, 2015

(65) Prior Publication Data
US 2015/0208431 A1  Jul. 23, 2015

Related U.S. Application Data (63) Continuation of application No. PCT/JP2012/075566, filed on Oct. 2, 2012.

(51) Int. Cl.
| | |
|---|---|
| *H04W 72/08* | (2009.01) |
| *H04W 4/08* | (2009.01) |
| *H04W 4/00* | (2009.01) |
| *H04B 7/024* | (2017.01) |
| *H04W 72/00* | (2009.01) |
| *H04B 7/06* | (2006.01) |
| *H04L 5/00* | (2006.01) |

(52) U.S. Cl.
CPC .......... *H04W 72/085* (2013.01); *H04B 7/024* (2013.01); *H04L 5/0069* (2013.01);
(Continued)

(58) Field of Classification Search
None
See application file for complete search history.

(56) References Cited

U.S. PATENT DOCUMENTS

| | | | |
|---|---|---|---|
| 6,553,228 B1 * | 4/2003 | Kotzin | H04W 68/00 |
| | | | 455/415 |
| 2004/0192350 A1 * | 9/2004 | Pelaez | H04W 4/08 |
| | | | 455/456.3 |

(Continued)

FOREIGN PATENT DOCUMENTS

| | | |
|---|---|---|
| JP | 2009-544249 A | 12/2009 |
| JP | 2012-85011 A | 4/2012 |

OTHER PUBLICATIONS

Vodafone, "Proposed SID: Provision of low-cost MTC UEs based on LTE", 3GPP TSG RAN meeting #53, RP-111112, Fukuoka, Japan, Sep. 13-16, 2011.

(Continued)

*Primary Examiner* — Hassan Kizou
*Assistant Examiner* — Ashil Farahmand
(74) *Attorney, Agent, or Firm* — Myers Wolin, LLC (57) ABSTRACT

A base station includes a controller to execute a process including grouping a plurality of wireless terminals into one or more groups using at least one of phases of signals and location information of each wireless terminal received from the plurality of wireless terminals, and allocating, to wireless terminals belonging to each group, resources to perform coordinated multi-point transmission by the wireless terminals in each group, a transmitter to transmit an identifier of each group and an allocation result of the resources to each wireless terminal, and a receiver to receive data transmitted from the wireless terminals of each group by the coordinated multi-point transmission.

10 Claims, 8 Drawing Sheets

(52) U.S. Cl.
CPC ............ *H04W 4/005* (2013.01); *H04W 4/08* (2013.01); *H04W 72/005* (2013.01); *H04B 7/0617* (2013.01); *H04B 7/0619* (2013.01); *H04B 7/0632* (2013.01); *H04L 5/0035* (2013.01); *H04W 72/08* (2013.01)

(56) References Cited

U.S. PATENT DOCUMENTS

| | | |
|---|---|---|
| 2008/0013500 A1 | 1/2008 | Laroia et al. |
| 2012/0027108 A1* | 2/2012 | Hong .................. H04B 7/024 375/260 |
| 2013/0155994 A1 | 6/2013 | Yoshizawa et al. |

OTHER PUBLICATIONS

Huawei et al., "Overview on low-cost MTC UEs based on LTE", 3GPP TSG RAN WG1 meeting #66bis, R1-112912, Zhuhai, China, Oct. 10-14, 2011.

Sony Corporation et al., "Considerations on Approaches for Low-Cost MTC UEs", 3GPP TSG RAN1 Meeting #66bis, R1-112917, Zhuhai, China, Oct. 10-14, 2011.

Ericsson et al., "Standards aspects impacting UE costs", 3GPP TSG RAN WG1 Meeting #66bis, R1-112929, Zhuhai, China, Oct. 10-14, 2011.

International Search Report issued for corresponding International Patent Application No. PCT/JP2012/075566, mailed Dec. 4, 2012.

\* cited by examiner

WIRELESS COMMUNICATION SYSTEM, BASE STATION AND WIRELESS TERMINAL FOR PERFORMING A COORDINATED UPLINK TRANSMISSION

CROSS-REFERENCE TO RELATED APPLICATION

This application is a continuation of International Application PCT/JP2012/075566 which was filed on Oct. 2, 2012, the entire contents of which are incorporated herein by reference.

FIELD

Disclosure relates to a wireless communication system, a base station and a wireless terminal.

BACKGROUND

Apparatuses, devices or instruments (hereinafter referred to as "apparatus(es)") connected to a wireless communication network continue to increase, and a communication method called machine-to-machine communication (M2M) may be one of the typical wireless communication methods in the near future.

In the M2M communication, apparatuses are connected through a communication network, and services are provided through autonomous information exchange (communication) between the apparatuses. Standardization of the M2M communication is advanced by standards organizations and forums, such as ITU-T (International Telecommunication Union-Telecommunication Standardization Sector) and 3GPP (3rd Generation Partnership Project). In the 3GPP, the M2M communication is called Machine Type Communication (MTC).

For more information, see:

RP-111112 "Proposed SID: Provision of low-cost MTC UEs based on LTE". Vodafone Group. 3GPP TSG RAN plenary #53; R1-112912 "Overview on low-cost MTC UEs based on LTE". Huawei, HiSiLicon, CMCC. 3GPP RAN1#66bis; R1-112917 "Considerations on approaches for low-cost MTC UEs". Sony Corporation/Sony Europe Ltd. 3GPP RAN1#66bis; and R1-112929 "Standards aspects impacting UE costs". Ericsson, ST-Ericsson. 3GPP RAN1#66bis.

Energy consumption is one of the issues to be studied in designing the machine-to-machine communication system (M2M system). Data transmission is one of tasks that results in large energy consumption.

SUMMARY

One of embodiments is a communication system including a base station and a plurality of wireless terminals. The base station includes a controller configured to execute a process including grouping the plurality of wireless terminals into one or more groups using at least one of phases of signals and location information of each wireless terminal received from the plurality of wireless terminals, and allocating, to wireless terminals belonging to each group, resources to perform coordinated multi-point transmission by the wireless terminals in each group based on reception power of a synchronization signal received from the wireless terminals of each group, and a transmitter configured to transmit an identifier of each group and an allocation result of the resources to each wireless terminal.

Each of the plurality of wireless terminals includes a communication apparatus configured to transmit a signal including the location information and the synchronization signal and to receive the allocation result of the resources; and a control apparatus configured to execute a process of sharing, in the group, data to be transmitted to the base station by the coordinated multi-point transmission using the allocated resources.

The target and advantages of the invention will be realized and attained by the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, an embodiment of the present invention will be described with reference to the drawings. The configuration of the embodiment is examples, and the present invention is not limited to the configuration of the embodiment.

In the following embodiment, a Long Term Evolution (LTE)-Advanced network will be described as an example of a wireless communication system (wireless communication network) in which a machine-to-machine communication system (M2M system) is applied. However, the technique described below may also be applied to wireless communication systems according to wireless communication standards based on IEEE 802.16e (wireless LAN), such as Wi-Fi and WiMAX, in addition to wireless communication systems according to wireless communication standards in 3GPP, such as Global System for Mobile Communications (GSM), (Universal Mobile Telecommunications System (UTMS (W-CDMA)), and LTE.

Figure 1:
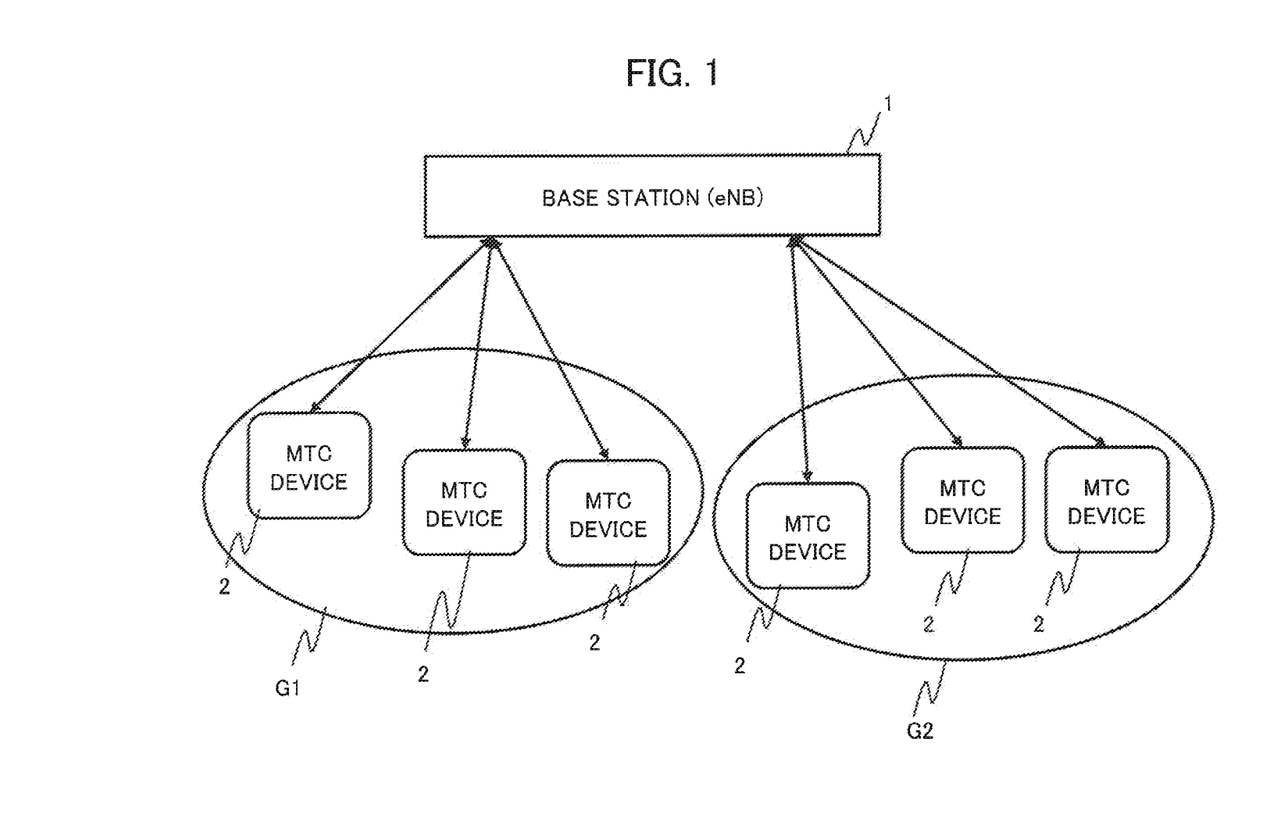
FIG. 1 illustrates an example of a network configuration of a machine-to-machine communication system according to an embodiment.

FIG. 1 illustrates an example of a network configuration of the machine-to-machine communication system according to the embodiment. The machine-to-machine communication system illustrated in FIG. 1 includes a base station (eNB) 1 and a plurality of MTC devices 2. The MTC device is an example of an M2M device. Each of the plurality of MTC devices 2 are mobile terminals called MTC UE (Machine Type Communication User Equipment). Each of the plurality of MTC devices 2 executes autonomous (without determination of user) information exchange (communication) with the base station and other MTC UEs. In the following description, the MTC device will be written as a "mobile terminal". However, the mobile terminal is an example of a "wireless terminal". The wireless terminal applied as an MTC device (M2M device) may include a mobile terminal and a fixed terminal.

The plurality of mobile terminals 2 are distributed in geographical areas. In FIG. 1, the plurality of mobile terminals 2 are grouped into a plurality of groups each of which includes two or more mobile terminals 2. In the example of FIG. 1, six mobile terminals 2 are illustrated, and the mobile terminals 2 are divided into two groups. One of the mobile terminals 2 belonging to one group may function as a representative device (group head).

The plurality of mobile terminals 2 in the group share data to be transmitted to the base station 1. The data may be shared by communication between the mobile terminals 2 or by communication through the group head. The plurality of mobile terminals 2 in the group transmit, to the base station 1, the data to be transmitted to the base station 1 by Coordinated Multi-Point transmission (CoMP) between mobile terminals (cooperative transmission between terminals). More specifically, the plurality of mobile terminals 2 synchronously transmit, to the base station 1, the data to be transmitted to the base station 1 as a common message signal. The CoMP transmission is called "Joint Transmission".

In the CoMP transmission between mobile terminals, a plurality of transmission antennas included in the plurality of mobile terminals 2 function as a virtual antenna array, and beamforming (directionality) for the base station 1 is performed. The beamforming may be called distributed beamforming in the sense that the plurality of transmission antennas of the plurality of mobile terminals 2 that are geographically separate from each other form one beamforming. The distributed beamforming may efficiently expand the coverage of the cell.

In the CoMP transmission of the common message signal, the cooperation of the plurality of transmission antennas may reduce transmitted power in each mobile terminal 2. It is generally known that in an antenna array with K (K is a positive integer) antenna elements, K times power reduction may be attained (transmitted power of each antenna element is 1/K). Therefore, the power consumption of each mobile terminal 2 can be reduced.

In the present embodiment, the plurality of mobile terminals 2 are divided (grouped) into a plurality of different groups based on channel phases between the mobile terminals 2 and the base station and based on distances between the mobile terminals 2. The cooperative transmission method of the common message signal based on the distributed beamforming is applied in the plurality of mobile terminals 2 in each group.

The distributed beamforming may be implemented based on resource quality information measured by the base station 1, such as SINR (Signal-to-Interference and Noise power Ratio). The base station 1 selects a group with high quality from the plurality of groups according to the SINR measured from each wireless resource. The phases of the signals transmitted from the mobile terminals 2 in the selected group are mostly uniform. Therefore, a beamforming gain (improvement of reception power) may be obtained. In other words, when the phases of the transmission signals of the mobile terminals 2 in the group are similar, the SINR of the common message signal transmitted from the group is good. Therefore, the beamforming gain is attained by allocating the resources according to the SINR value.

The measurement of the SINR (resource quality) may be implemented by, for example, feedback of Channel Quality Indicator (CQI) based on reception quality measurement carried out by each mobile terminal 2. The CQI is included in a Channel State Information (CSI) reference signal and transmitted. The CQI is an example of quality information.

The base station 1 may receive CQI feedback for each wireless resource from each mobile terminal 2 to select a group with good quality. In other words, the CQI in the group is good when the phases of the transmission signals of the mobile terminals 2 in the group are similar, and the beamforming gain may be obtained by resource allocation according to the CQI.

<System Model>

A machine-to-machine communication network (machine-to-machine communication system) including one base station 1 and N mobile terminals 2 will be illustrated here. For example, among the N mobile terminals 2, the base station 1 selects the mobile terminal 2 with excellent (for example, best in the group) channel state information in the base station 1 so that the mobile terminal 2 operates as a group head. The selection result of the group head by the base station 1 is fed back to the mobile terminals 2. As a result, the N mobile terminals 2 form a group of a virtual antenna array including the selected group head.

Each mobile terminal 2 includes data to be transmitted to the base station 1. The data is exchanged between the mobile terminals 2. For example, each mobile terminal 2 transmits the data to the mobile terminal 2 of the group head. The group head broadcasts the data to all of the mobile terminals 2 in the group. As a result, the mobile terminals 2 share the data (common message) to be transmitted to the base station 1.

The mobile terminals 2 in the group use the distributed beamforming to transmit the common message signal to the base station 1 (to perform cooperative transmission between terminals). When the phases of the signals from the mobile terminals 2 are uniform, the reception power of the base station 1 is large (large beamforming gain is obtained). When the mobile terminals 2 (MTC devices) are fixed or the mobility of the mobile terminals 2 is low, the variation in the wireless channel is low speed.

It is assumed that the channel is static due to a narrowband signal and that the channel between an i (i=1, . . . , N)-th mobile terminal 2 and the base station 1 is modeled by a complex scalar. In this case, a channel h is expressed by Formula (1).

[Formula (1)]

$$h_i = a_i e^{j\gamma_i} \quad (1)$$

In a line-of-sight (LOS) channel, a phase $\gamma_i$ of an i-th channel $h_i$ is expressed by Formula (1a). In Formula (1a), $\tau_i$ represents a propagation delay between the i-th mobile terminal 2 and the base station 1, $d_i$ represents corresponding distance, and c represents speed of light.

[Formula (1a)]

$$\gamma_i = 2\pi f_c \tau_i = 2\pi f_c d_i/c \quad (1a)$$

The mobile terminal 2 transmits the common message signal to the base station 1 based on modulation of a signal s(t) using a current carrier. A current carrier x(t) is expressed by the following Formula (2).

[Formula (2)]

$$x_i(t) = s(t) e^{j(2\pi f_c t + \psi_i)} \quad (2)$$

In Formula (2), $f_c$ represents a current carrier frequency of the i-th mobile terminal 2, and $\psi_i$ represents an initial phase. A reception signal $r_{eNB}$ (cooperative transmission signal) of the base station 1 is provided by the following Formula (3), wherein n(t) represents noise.

[Formula (3)]

$$r_{eNB}(t) = \sum_{i=1}^{n} h_i x_i(t) + n(t) \quad (3)$$

$$= \sum_{i=1}^{n} a_i s(t) e^{j(2\pi f_c t + \gamma_i + \psi_i)} + n(t)$$

<Grouping Method>

Figure 2:
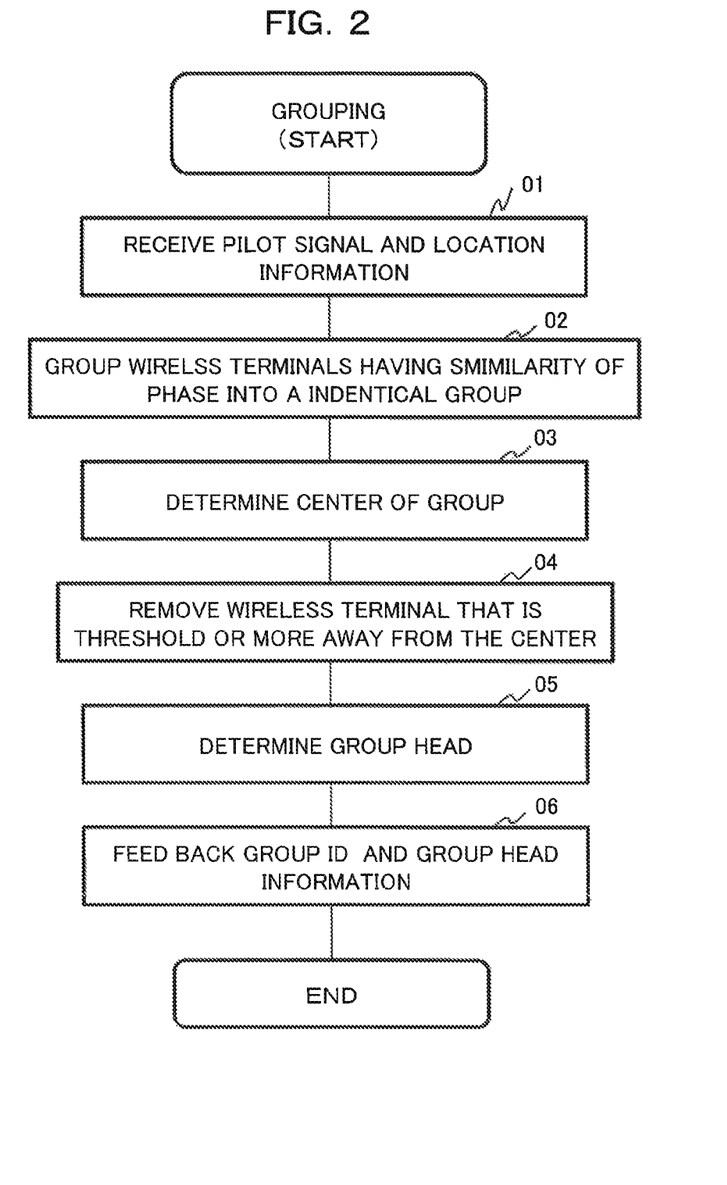
FIG. 2 is a flow chart illustrating an example of a grouping method (grouping process)

The phase of the channel between each mobile terminal 2 and the base station 1 and the distance between mobile stations are used for the division (grouping) of the groups. FIG. 2 is a flow chart illustrating an example of a grouping method (grouping process).

The base station 1 first receives a Sounding Reference Signal (SRS) that is a pilot signal received from each mobile terminal 2 (01 of FIG. 2). The base station 1 measures the phase of the channel based on the pilot signal and divides the plurality of mobile terminals 2 into one or more groups using the similarity of the phase of the channel to (02 of FIG. 2). More specifically, a high layer in the base station 1 includes a threshold (range) of the similarity of the phase based on previous experimental results, and the mobile terminals 2 with similarity in the phase are put into the same group based on the threshold.

The base station 1 receives location information of the mobile terminal 2 received from each mobile terminal 2. The location information is received along with the pilot signal or by another signal. Each mobile terminal 2 has a Global Positioning System (GPS) function and may use the GPS function to transmit the obtained location information to the base station 1. The base station 1 uses the location information of each mobile terminal 2 to determine a geographical center position of the group from the positions of the mobile terminals 2 in the same group (03 of FIG. 2).

The center of the group is determined, for example, as follows. When j (j is a positive integer: 1, . . . , j) mobile terminals 2 belong to one group, the position of each mobile terminal 2 may be indicated by (xj, yj) in a plane coordinate (xy coordinate) system. The center position of the group may be obtained by calculating an average of x coordinates and y coordinates of the mobile terminals. More specifically, the center position (x, y) of the group may be obtained by ((x1+x2, . . . , +xj)/j, (y1+y2, . . . , +yj)/j).

The base station 1 may remove, from the group, the mobile terminal 2 that is a predetermined distance or more away from the determined center position of the group (04 of FIG. 2). This is because the data exchange before the joint transmission may be difficult in the mobile terminal 2. Specifically, the high layer of the base station 1 includes a threshold of distance from the center, and the mobile terminal 2 in which the distance from the center is longer than the threshold is removed from the group. The threshold of distance may be obtained by, for example, experiments. Note that the process of 04 may be selectively applied.

By the processes of 01 to 04, the mobile terminals 2 as members of the group are determined. The base station 1 further determines the mobile terminal 2 as the group head using the method as described above (05 of FIG. 2). The base station 1 then transmits (feeds back) a group ID being an identifier of the group and information (group head information) of the mobile terminal 2 as the group head to the mobile terminals of the members (including the group head) through, for example, a Physical Downlink Control CHannel (PDCCH) (06 of FIG. 2).

The center position of the group may also be obtained by other methods. For example, a middle point or a center of a straight line, a triangle, a rectangle, or a polygon with five or more sides formed by connecting the positions of the plurality of mobile terminals 2 by straight lines may be determined as the center position of the group. Alternatively, the group head is determined before determining the center position of the group, and the coordinates of the group head may be determined as the center of the group. The mobile terminals 2 included in a circle, the radius of which is a threshold of distance from the coordinates of the group head, may be determined as final group members.

<UE Scheduling after Grouping>

Figure 3:
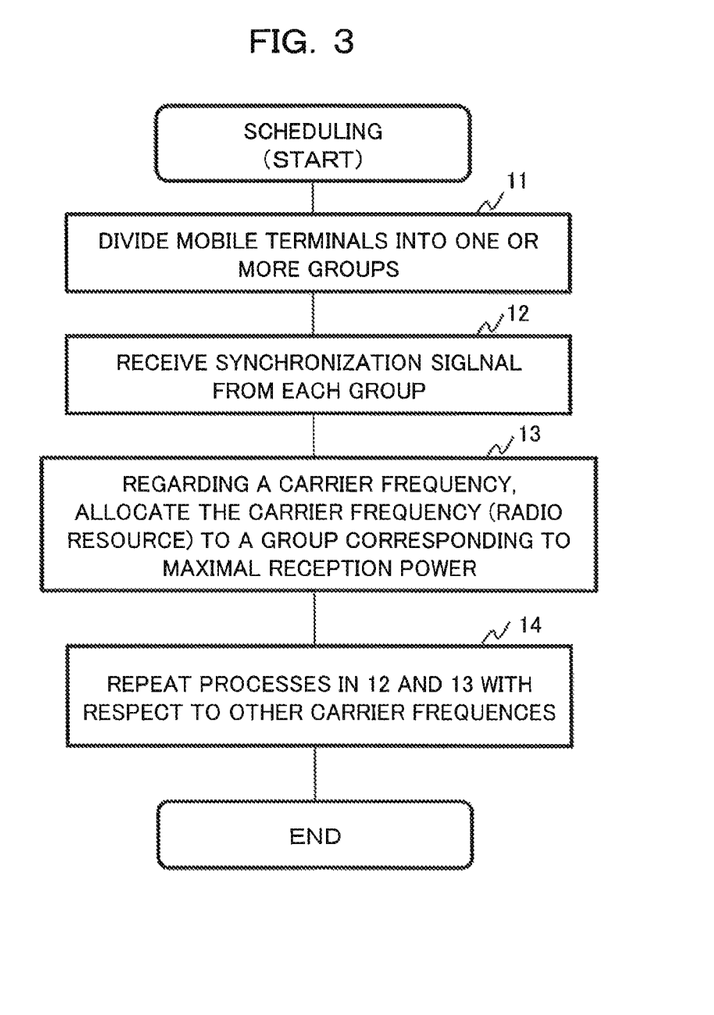
FIG. 3 is a flow chart illustrating an example of a scheduling method (scheduling process)

Hereinafter, an outline of a procedure of scheduling in the mobile terminals 2 after grouping will be described. FIG. 3 is a flow chart illustrating an example of a scheduling method (scheduling process).

(Procedure 1: 11 of FIG. 3)

First, the plurality of mobile terminals 2 receive the group ID and the group head information from the base station 1 in the grouping process (FIG. 2), and the plurality of mobile terminals 2 are divided into k (k is a positive integer) groups, i.e. $G_1$, $G_2$, . . . , $G_k$. FIG. 1 illustrates a case in which six mobile terminals 2 are divided into two groups G1 and G2.

(Procedure 2: 12 of FIG. 3)

Second, the plurality of mobile terminals 2 belonging to each group transmit, using the same time slot in the group, a synchronization signal to the base station 1 in a time-division manner between groups. More specifically, an i-th UE in a k-th group transmits a signal expressed by Formula (4).

[Formula (4)]

$$x_{i,k}(t) = e^{j(2\pi f_{c1} t + \psi_i)} \quad (4)$$

In this way, the groups use different time slots, and the synchronization signal is transmitted from the mobile terminals 2 of each group. A reception signal of a carrier frequency $f_{c1}$ received by the base station 1 from the k-th group is expressed by the following Formula (5).

[Formula (5)]

$$r_{eNB, f_{c1}, G_k}(t) = \sum_{i=1}^{n_k} h_i x_i(t) + n(t) \quad (5)$$

$$= \sum_{i=1}^{n_k} a_i e^{j(2\pi f_{c1} t + \gamma_i + \psi_i)} + n(t)$$

In Formula (5), $n_k$ represents the number of mobile terminals 2 in the k-th group. The base station 1 measures reception signal power at the frequency $f_{c1}$ of all groups. The reception signal power is expressed by the following Formula (5a).

[Formula (5a)]

$$P_{f_{c1}, G_k} = |r_{eNB, f_{c1}, G_k}(t)|^2 \quad (5a)$$

(Procedure 3: 13 of FIG. 3)

Third, the base station 1 allocates the frequency $f_{c1}$ to the group with predetermined power of the reception signal power of each group, such as the group with maximal reception power. For example, the carrier frequency $f_{c1}$ is allocated to the group G1 if the condition of the following Formula (5b) is satisfied.

[Formula (5b)]

$$P_{f_{c1},G_1} > P_{f_{c1},G_k} k=2, \ldots K \qquad (5b)$$

(Procedure 4: 14 of FIG. 3)

Fourth, the base station 1 changes the carrier frequency $f_{ci}$ (i=2, ..., L) and repeats the procedures (1) to (4) to allocate the frequency to the group corresponding to the maximal reception power.

Figure 4:
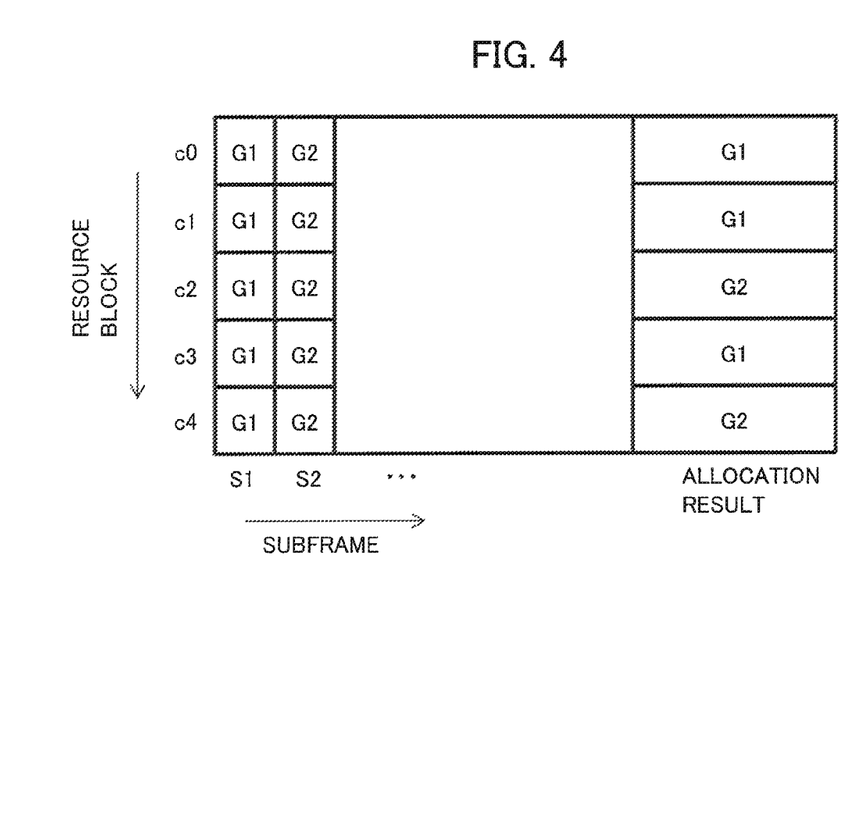
FIG. 4 illustrates an example of allocation of wireless resources in scheduling.

FIG. 4 illustrates an example of allocation of wireless resources (radio resources) in scheduling. FIG. 4 illustrates an allocation status of wireless resources in the case including the groups G1 and G2 as illustrated in FIG. 1. The wireless resources are defined by a plurality of carrier frequencies or resource blocks (FIG. 4 illustrates c0 to c4) and subframes S1, S2, . . . .

It is assumed that in FIG. 4, the group G1 is measured at the carrier frequencies c0 to c4 of the subframe S1, and the group G2 is measured at the carrier frequencies c0 to c4 of the subframe S2.

It is determined that the reception signal power of the group G1 is larger than that of the group G2 at the carrier frequencies c0, c1, and c3 in the procedures 1 to 4 of the scheduling described with reference to FIG. 3, and as a result, the carrier frequencies c0, c1, and c3 are allocated to the group G1. On the other hand, it is determined that the reception signal power of the group G2 is larger than that of the group G1 at the carrier frequencies c2 and c4, and as a result, the carrier frequencies c2 and c4 are allocated to the group G2. The groups G1 and G2 may carry out, using the allocated resources, the cooperative transmission between terminals.

<Example of Configuration of Base Station>

Figure 5:
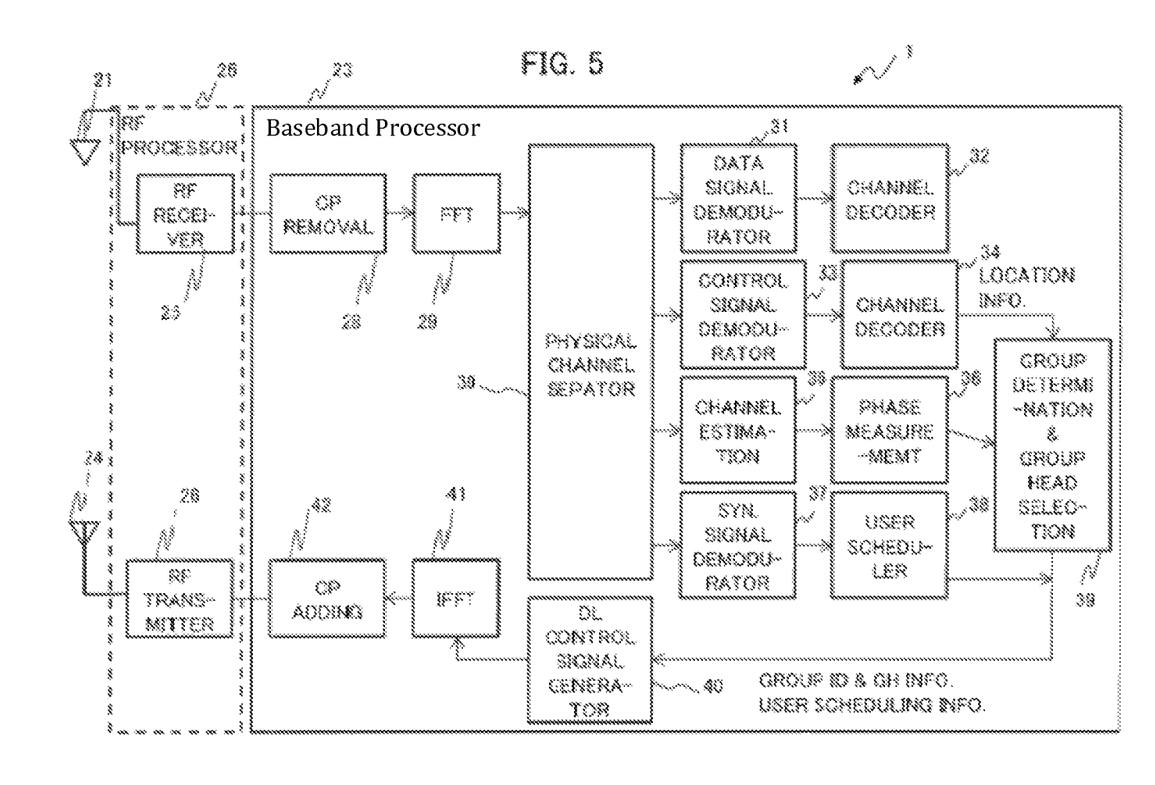
FIG. 5 illustrates an example of a configuration of a base station 1 according to the embodiment.

FIG. 5 illustrates an example of a configuration of the base station 1 according to the embodiment. FIG. 5 illustrates an example of a configuration of a base station in a wireless communication system (mobile communication system) in which an orthogonal frequency division multiple access (OFDMA) system is applied as a wireless access system.

In FIG. 5, the base station 1 includes a reception antenna 21, a Radio Frequency (RF) processor (RF processor: RF transmitter and receiver) 22, a baseband processor 23, and a transmission antenna 24. The baseband processor 23 is an example of a "controller" or "control apparatus". The RF processor 22 is an example of a "communication apparatus", a "transmission apparatus" or "transmitter", and a "reception apparatus" or "receiver".

The RF processor 22 manages processes regarding wireless (RF) signals. The RF processor 22 includes an RF receiver 25 connected to the reception antenna 21 and an RF transmitter 26 connected to the transmission antenna 24. The RF receiver 25 executes processing, such as low-noise amplification and down-conversion, of a wireless signal (uplink (UL) signal) from the mobile terminal 2 received by the reception antenna 21 and inputs the obtained signal to the baseband processor 23. The RF transmitter 26 up-converts and amplifies a signal inputted from the baseband processor 23 and transmits the obtained wireless signal as a downlink (DL) signal from the transmission antenna 24 to the mobile terminal 2.

The baseband processor 23 is implemented by, for example, applying a general-purpose processor, such as a Digital Signal Processor (DSP) and/or a Central Processing Unit (CPU), or a dedicated processor. The baseband processor 23 loads a program stored in a storage device (auxiliary storage device) not illustrated to a main storage device (main memory) to execute the program.

In this way, the baseband processor 23 implements the following processes or functions. More specifically, the baseband processor 23 executes cyclic prefix (CP) removal 28 and fast Fourier transform (FFT) 29 and functions as a physical channel separator 30 that separates the physical channel.

The baseband processor 23 also functions as a data signal demodulator 31 for a signal (data signal) of a user data channel separated by the physical channel separator 30. The baseband processor 23 also functions as a channel decoder 32 that executes a decoding process of the data channel.

The baseband processor 23 also functions as a control signal demodulator 33 for a signal (control signal) of a control channel separated by the physical channel separator 30. The baseband processor 23 also functions as a channel decoder 34 that executes a decoding process of the control channel.

The baseband processor 23 also functions as channel estimation 33 based on a signal (pilot signal) of a pilot channel separated by the physical channel separator 30. The baseband processor 23 also functions as a channel decoder 34 that executes a decoding process of the control channel. A channel estimation result obtained by the channel estimation 33 is provided to the channel decoders 32 and 34 and used in a channel decoding process.

The baseband processor 23 also executes group determination and group head selection 39. More specifically, the baseband processor 23 functions as a grouping processor that executes the grouping process (FIG. 2) by using location information of the mobile terminal obtained as a decode result of the control channel by the channel decoder 34 and using a phase measurement result obtained by the phase measurement 36. In the grouping process, the group determination and the group head selection are performed, and a group ID and group head (GH) information are generated. The baseband processor 23 uses a threshold (range) of the phase and a threshold of the distance stored in a storage area of a storage device not illustrated to perform the group determination and group head selection 39.

The baseband processor 23 also functions as a measurer that executes phase measurement 36 of the pilot signal. The baseband processor 23 also functions as a synchronization signal demodulator 37 that executes a demodulation process of the synchronization signal separated by the physical channel separator 30. The baseband processor 23 also functions as a user scheduler 38 that executes a scheduling process for the user based on a demodulation result of the synchronization signal.

The user scheduler 38 executes scheduling of the mobile terminals 2 based on the demodulation result of the synchronization signal, i.e. wireless resource allocation process for each group (FIG. 5). In this case, the user scheduler 38 uses the reception power of each synchronization signal measured by, for example, the RF receiver 25 (RF processor 26) or the baseband processor 23 (for example, synchronization signal demodulator 37) to determine the allocation of the carrier frequencies and the subframes to the groups. The user scheduler 38 generates user scheduling information including a resource (carrier frequency) allocation result.

The baseband processor 23 also functions as a downlink (DL) control signal generator 40. The downlink signal generator 40 is a generator that generates a control signal including the group ID and the group head information or a control signal including the user scheduling information.

The baseband processor 23 also performs inverse fast Fourier transformation (IFFT) 41 of the control signal generated by the control signal generator 40 and performs CP adding 42 for providing CP to the signal obtained by the IFFT 41. The signal after the CP adding 42 is converted to a wireless signal by the RF transmitter 26 and transmitted from the transmission antenna 24.

The configuration of the base station 1 is illustrative, and for example, the processes and the functions (blocks illustrated in FIG. 5) implemented by the RF processor 22 and the baseband processor 23 may be implemented by at least one of integrated circuits, such as an Integrated Circuit (IC), a Large Scale Integrated circuit (LSI), and an Application Specific Integrated Circuit (ASIC), or by a combination of two or more of the integrated circuits. The processes and the functions implemented by the baseband processor 23 may also be implemented by a programmable logic device (PLD), such as Field Programmable Gate Array (FPGA), or by a combination of the integrated circuit and the PLD.

<Example of Configuration of M2M Device>

Figure 6:
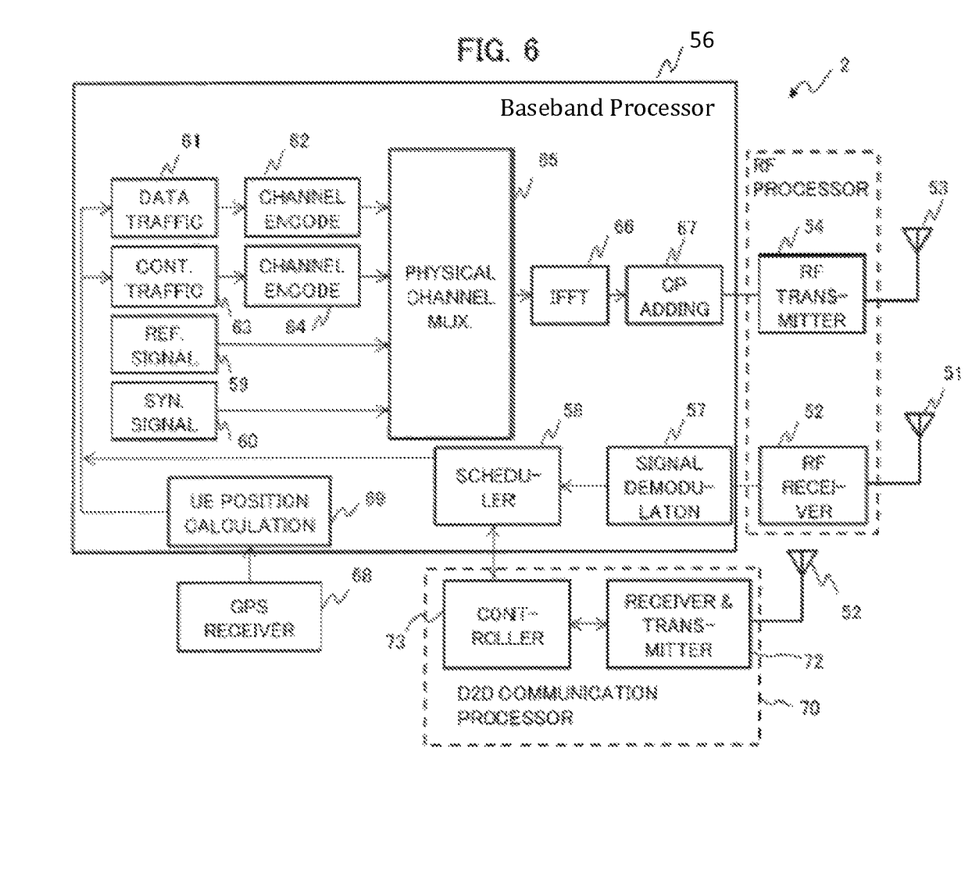
FIG. 6 illustrates an example of a configuration of a mobile terminal as an example of an MTC device (M2M device) according to the embodiment.

FIG. 6 illustrates an example of a configuration of the mobile terminal 2 as an example of the MTC device (M2M device) according to the embodiment. FIG. 6 illustrates an example of a configuration of the UE in the mobile communication system to which the OFDMA system is applied.

In FIG. 6, the mobile terminal 2 includes: an RF processor (RF transmitter and receiver) 55 including an RF receiver 52 connected to a reception antenna 51 and including an RF transmitter 54 connected to a transmission antenna 53; and a baseband processor 56. The baseband processor 56 is an example of a control apparatus. The RF processor 55 is an example of a communication apparatus.

The processes and the functions executed by the RF processor 55 are similar to the processes and the functions executed by the RF processor 26 illustrated in FIG. 5, and the description will not be repeated. Like the baseband processor 23 (FIG. 5), the baseband processor 56 is implemented by a general-purpose processor, such as a DSP and a CPU, or a dedicated processor. The baseband processor 56 loads a program stored in an auxiliary storage device not illustrated to a main storage device and executes the program to thereby execute the following processes and implement the following functions.

More specifically, the baseband processor 56 functions as a signal demodulator 57 that executes a signal demodulation process of a signal (reception signal) from the RF receiver 52. The signal demodulator 57 performs CP removal, FFT, physical channel separation, channel estimation, demodulation process of data signal and control signal, and decoding process of data channel and control channel.

The baseband processor 56 also functions as a scheduler 58 that performs scheduling based on a demodulation result of the reception signal obtained by the signal demodulator 57. The scheduler 58 receives, as the demodulation result, the group ID and the GH information transmitted from the base station 1 as well as the scheduling information. Based on the group ID and the GH information, the scheduler 58 performs information exchange with the mobile terminals 2 in the group, transmission of synchronization signal, and scheduling for cooperative transmission.

The baseband processor 56 executes a reference signal generation process (Ref. Signal) 59 of generating a pilot signal (reference signal; for example, SRS) and a generation process (SYN. Signal) 60 of a synchronization signal with the mobile terminals 2 in the group.

The baseband processor 56 also executes a process (Data Traffic) 61 regarding data channel traffic and an encode process (Channel Encode) 62 of a data channel. As a result, user data (for example, common message for cooperative transmission) is transmitted through the user channel.

The baseband processor 56 also executes a process 63 (Control Traffic) regarding control channel traffic and an encode process (Channel Encode) 62 of a control channel. As a result, control information including quality information based on DL reception power in the mobile terminal 2 such as CQI (SINR) is transmitted through the control channel.

The baseband processor 56 also functions as a physical channel multiplexer 65 to multiplex the data channel, the control channel, the pilot channel, and the synchronization signal channel. IFFT 66 and CP adding 67 are applied to the multiplexed signal. The signal after the CP adding 67 is inputted to the RF transmitter 54, converted into an uplink wireless signal, and transmitted from the transmission antenna 53.

The mobile terminal 2 further includes a GPS receiver 68. The GPS receiver 68 receives a reception signal from a GPS satellite. The reception signal is used in UE position calculation 69 of the mobile terminal 2 executed by the baseband processor 56. The location information of the mobile terminal 2 calculated in the UE position calculation 69 is part of the control information transmitted to the base station 1 through the control channel.

The mobile terminal 2 further includes a D2D communication processor (Device-to-Device Communication Processor) 70. The D2D communication processor 70 includes: a receiver and transmitter 72 connected to a transmission/reception antenna 71; and a controller 73. The receiver and transmitter 72 manages a process regarding transmission and reception of information exchanged with other mobile terminals 2 in the group. The receiver and transmitter 72 transmits and receives data for the cooperative transmission between terminals to and from the group head. The D2D communication processor 70 is an example of a cooperative communication apparatus.

The controller 73 controls the operation and process by the receiver and transmitter 72. For example, the controller 73 controls transmission and reception of data to be shared between the group members through the group head. For example, the controller 73 receives data to be transmitted to other mobile terminals 2 from the scheduler 58 and uses the receiver and transmitter 72 and the transmission/reception antenna 71 to transmit the data to the group head. The controller 73 supplies data from other mobile terminals 2 received from the group head to the scheduler 58.

The processes and the functions (blocks of FIG. 6) executed by the RF processor 55, the baseband processor, 56, and the D2D communication processor 70 can be implemented by at least one of integrated circuits such as, IC, LSI, and ASIC, by a combination of two or more of the integrated circuits, or by a combination of an integrated circuit and PLD (or dedicated or general-purpose processor).

<Sequence for Terminal-to-Terminal Cooperative Transmission (Joint Transmission)>

Figure 7:
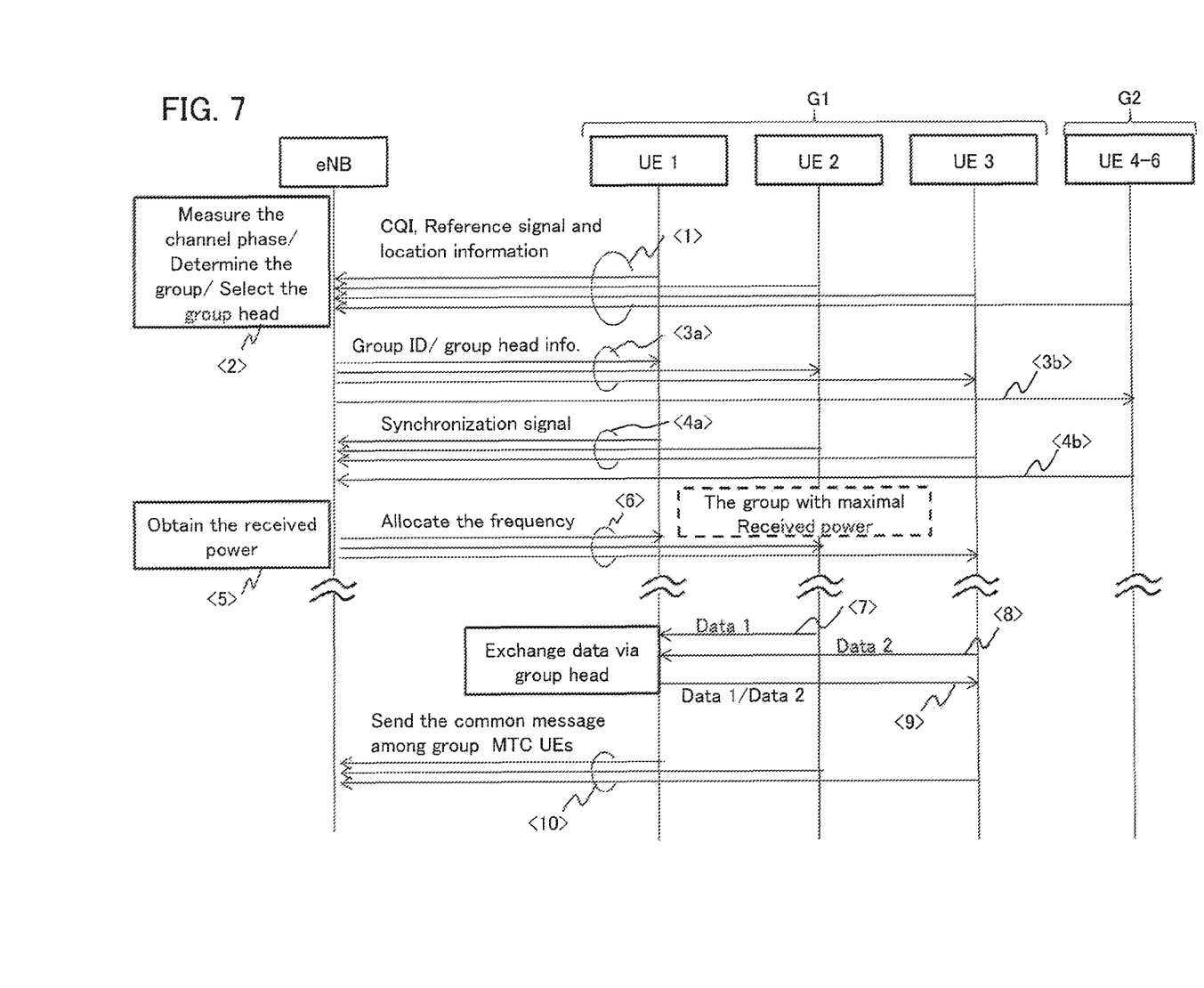
FIG. 7 illustrates an example of a sequence indicating a procedure for terminal-to-terminal cooperative transmission (joint transmission)

FIG. 7 illustrates an example of a sequence illustrating a procedure for cooperative transmission (joint transmission). FIG. 7 illustrates an example including one base station (eNB) and six mobile terminals 2 (UEs 1 to 6) connected to the eNB. However, the UE 4, the UE 5, and the UE 6 are illustrated together in FIG. 7. In the following description, the UEs 1 to 6 are written as "UEs" when the UEs 1 to 6 are not distinguished.

First, each UE transmits a signal including a reference signal, location information, and quality information (CQI (SINR)) to the eNB. For example, each UE generates a signal, in which a pilot channel including the reference signal (pilot signal) and a control channel including the quality information (CQI (SINR)) and the location information are multiplexed, and transmits the signal to the eNB (FIG. 7<1>).

The eNB performs the channel estimation 35 and the phase measurement 36 of the reference signal from each UE and further executes the group determination and group head selection 39 (FIG. 7<2>). In the example illustrated in FIG. 7, the group G1 with members UE 1 and UE 2 and the group G2 with members UE 3 to UE 6 are determined based on the phase measurement result and the location information.

UE 0 is selected as the group head based on the CQI (SINR) of the UEs 1 to 3 in the group G1. It is assumed that in the group G2, the UE 4 is selected as the group head, for example.

The eNB transmits the group ID and the group head information to the UEs 1 to 3 of the group G1 (FIG. 7<3a>). In this case, the eNB notifies the UEs 1 to 3 of the time slot for synchronization signal transmission. Similarly, the eNB transmits the group ID and the group head information to the UEs 4 to 6 of the group G2 (FIG. 7<3b>). In this case, the eNB notifies the UEs 4 to 6 of a time slot different from the time slot for the group G1 as a time slot for synchronization signal transmission.

The UEs 1 to 3 of the group G1 transmit, to the eNB, a synchronization signal at the uplink carrier frequency $f_{c1}$ in the time slot designated for the group G1 by the eNB (FIG. 7<4a>). The UEs 4 to 6 of the group G2 transmits, to the eNB, a synchronization signal at the frequency $f_{c1}$ in the time slot for the group G2 (different from the time slot for G1) designated by the eNB (FIG. 7<4b>).

The eNB measures the reception power of each of the groups G1 and G2 regarding the frequency $f_{c1}$ (FIG. 7<5>) and allocates the frequency $f_{c1}$ to the group with maximal reception power. In the example of FIG. 7, the frequency fc1 is allocated to the group G1, and the allocation result is transmitted to the UEs 1 to 3 (FIG. 7<6>).

Although not illustrated, the procedures of FIG. 7<4a>, <4b>, <5>, and <6> are repeatedly executed for other uplink carrier frequencies $f_{c2}$ to $f_{cL}$. Subsequently, scheduling for distributed forming (cooperative transmission) is performed in each of the groups G1 and G2.

In each of the groups G1 and G2, data exchange for distributed beamforming (cooperative transmission) is performed between the UEs in the group through the group head. In the example illustrated in FIG. 7, the UE 2 transmits data 1 to be shared to the group head (UE 0) (FIG. 7<7>), and the UE 3 transmits data 2 to be shared to the group head (UE 0) (FIG. 7<8>). The group head information received from the eNB (base station 1) includes an address of the group head, and each UE transmits the address of the group head and the group ID along with the data to be transmitted to the group head. Based on the group ID, the group head (UE 0) uses at least one of the data received from each member and data held by the group head to generate a common message to be transmitted to the eNB (base station) by cooperative transmission. In the example of FIG. 7, the group head (UE 0) generates a common message including the data 1 and the data 2 and broadcasts the common message to the group members (UE 2 and UE 3) (FIG. 7<9>). In this case, the group ID is provided to the broadcasted common message. As a result, the UE 2 and the UE 3 in the group can import the common message.

In FIG. 7<9>, the group head (UE 0) may broadcast the data 1 and the data 2, and each of the group members (UE 2 and UE 3) may generate the common message.

The UEs 1 to 3 use the allocated carrier frequency (for example, $f_{c1}$) to transmit the common message to the eNB at the same timing (FIG. 7<10>). As a result, the same common message is transmitted from the geographically distributed UEs 1 to 3 to the eNB, and the distributed beamforming is performed. The process and the operation of <1> to <10> are autonomously executed between the base station (eNB) and the mobile terminal (UE) and between the mobile terminals (UEs) without involvement of the user.

According to the present embodiment, the total power consumption of the machine-to-machine communication system is reduced by the distributed beamforming gain (improvement of reception power). For example, the transmitted power, i.e. power consumption, in the mobile terminals 2 is suppressed compared to when the individual mobile terminals 2 independently transmit the common message by the distributed beamforming. The coverage of the cell is expanded if the mobile terminals 2 in the group transmit the common message signal by the same transmitted power.

The grouping method in the present embodiment accelerates the effect of beamforming. This is because the phases of the common message signals transmitted from the mobile terminals 2 in the same group are substantially the same.

In the present embodiment, the data is exchanged in the group before the simultaneous transmission of the common messages from the plurality of mobile terminals 2 in the group. This can prevent the mobile terminals 2 from individually accessing the base station 1, and the control channel overhead may be reduced.

In the present embodiment, the group head is selected in each group, and the data is exchanged in the group through the group head. The group head may receive the data from each member and collectively deliver (broadcast) the data to each member to thereby reduce the amount of communication regarding the data exchange between the members. Therefore, the process of selecting the group head may be selectively applied.

The present embodiment may be used in a multipath environment in which the phase of the channel is independent of the propagation distance of a single path. This is because the reception power varies with different carrier frequencies. Therefore, the beamforming gain may be obtained at each carrier frequency.

<Modified Example>

Figure 8:
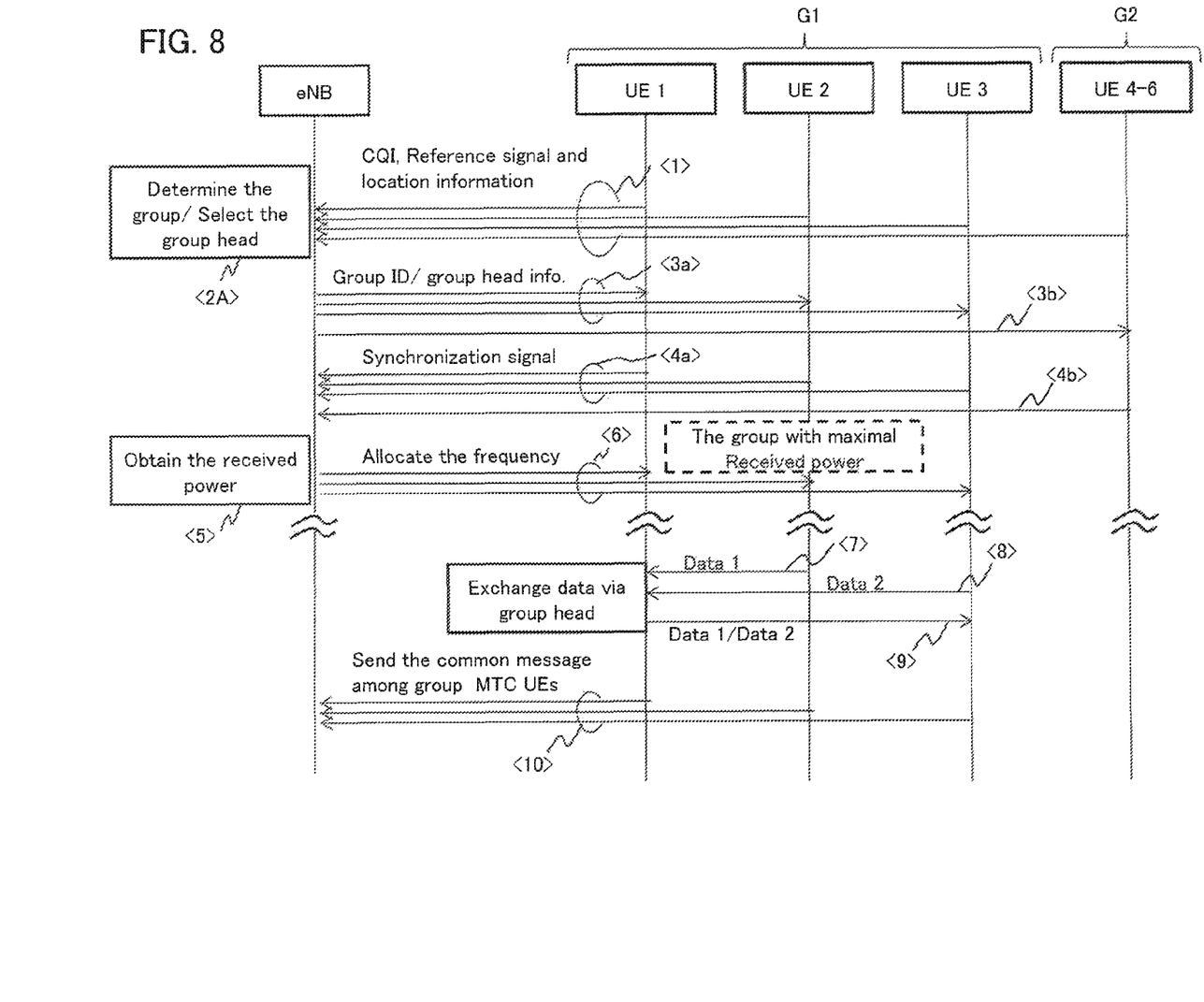
FIG. 8 illustrates a sequence diagram according to a modified example.

The example of determining the groups from the phase and the location information is described in the embodiment described above. Meanwhile, the groups may be determined by using the location information without using the phase information. FIG. 8 illustrates a sequence of a modified example.

More specifically, the phase measurement 36 (FIG. 5) is not executed in the modified example, and the groups are determined from the location information in the group determination and group head selection 39. For example, the entire area of a range (for example, cell) in which the mobile terminal 2 may be positioned is divided into a predetermined number of divided areas (grids), and one or more mobile terminals 2 positioned in each grid are grouped into each group.

FIG. 8 is different from the sequence of FIG. 7 in that a process of <2A> is executed in place of the process of <2> illustrated in FIG. 7. The processes after <3a> illustrated in FIG. 8 are the same as in FIG. 7, and the description will not be repeated. In the modified example, the carrier frequency is also allocated to the group with maximal reception power in <5>. This is because it may be expected that the phases of the synchronization signals from the group with maximal reception power are uniform. In this way, at least one of the phase and the location information may be used to determine the group in the group determination process. When the reception power of the group with maximal reception power exceeds a predetermined threshold, it may be determined that the phases are aligned, and the carrier frequency may be allocated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system, comprising:
   a base station; and
   a plurality of wireless terminals,
   the base station including:
   a controller configured to execute a process including grouping the plurality of wireless terminals into one or more groups using at least one of phases of signals and location information of each wireless terminal received from the plurality of wireless terminals, and
   allocating, to wireless terminals belonging to each group, resources to perform coordinated multi-point transmission by the wireless terminals in each group based on reception power of a synchronization signal received from the wireless terminals of each group; and
   a transmitter configured to transmit an identifier of each group and an allocation result of the resources to each wireless terminal,
   each of the plurality of wireless terminals including:
   an RF processor configured to transmit a signal including the location information and the synchronization signal and to receive the allocation result of the resources; and
   a baseband processor configured to execute a process of sharing, in the group, data to be transmitted to the base station by the coordinated multi-point transmission using the allocated resources.

2. The wireless communication system according to claim 1, wherein:
   the controller is configured to execute a process of selecting a group head of each group using quality information received from the plurality of wireless terminals;
   the transmitter is configured to transmit information of the selected group head to the plurality of wireless terminals; and
   the wireless terminals in each group perform data exchange through the group head to share data to be transmitted to the base station in the group.

3. The wireless communication system according to claim 2, wherein the controller is configured to select, as the group head, the wireless terminal corresponding to quality information indicating best quality among the wireless terminals belonging to one group.

4. The wireless communication system according to claim 1, wherein the controller is configured to determine a center position of each group using the location information, and to remove, from the group, the mobile terminal that is a threshold or more away from the center position.

5. The wireless communication system according to claim 1, wherein the controller is configured to group, into one group, the wireless terminals in which phases of reception signals are within a predetermined threshold.

6. The wireless communication system according to claim 1, wherein the controller is configured to divide an area into a plurality of divided areas, and to group the wireless terminals being in each divided area into one group.

7. A base station, comprising:
   a controller configured to execute a process including grouping a plurality of wireless terminals into one or more groups using at least one of phases of signals and location information of each wireless terminal received from the plurality of wireless terminals, and
   allocating, to wireless terminals belonging to each group, resources to perform coordinated multi-point transmission by the wireless terminals in each group based on reception power of a synchronization signal received from the wireless terminals of each group;
   a transmitter configured to transmit an identifier of each group and an allocation result of the resources to each wireless terminal; and
   a receiver configured to receive data, shared in each group, transmitted from the wireless terminals of each group by the coordinated multi-point transmission.

8. A wireless terminal, comprising:
   a transmitter configured to transmit a signal including location information to a base station;
   a receiver configured to receive, from the base station, an identifier of a group to perform coordinated multi-point transmission, the wireless terminal belonging to the group with one or more other wireless terminals;
   the transmitter further configured to transmit a synchronization signal to the base station along with one or more other wireless terminals;
   baseband processor configured to execute a process including sharing, in the group, data to be transmitted to the base station with the coordinated multi-point transmission performed by the wireless terminals belonging to the group, the coordinated multi-point transmission being performed using resources allocated by the base station, the resources being allocated based on reception power of the synchronization signal received by the base station.

9. A control method of coordinated multi-point transmission performed by wireless terminals, the method comprising:
   grouping, using a base station, a plurality of wireless terminals into one or more groups using at least one of phases of signals and location information of each wireless terminal received from the plurality of wireless terminals;
   allocating, using the base station, to wireless terminals belonging to each group, resources to perform coordinated multi-point transmission by the wireless terminals in each group based on reception power of a synchronization signal received from the wireless terminals of each group;
   transmitting, using the base station, an identifier of each group and an allocation result of the resources to the plurality of wireless terminals; and
   receiving data, shared in each group, transmitted from the wireless terminals of each group by the coordinated multi-point transmission.

10. A control method of coordinated multi-point transmission performed by wireless terminals belonging to a group, the method comprising:
- transmitting, using a wireless terminal included in the wireless terminals, a signal including location information to a base station;
- receiving, using the wireless terminal, an identifier of the group from the base station;
- transmitting, using the wireless terminal, a synchronization signal to the base station along with other wireless terminals belonging to the group; and
- executing, using the wireless terminal, a process of sharing, in the group, data to be transmitted to the base station by the coordinated multi-point transmission using resources allocated by the base station, the resources being allocated based on reception power of the synchronization signal in the base station.

* * * * *